United States Patent [19]
Tenghamn

[11] Patent Number: 6,085,862
[45] Date of Patent: Jul. 11, 2000

[54] DRIVE ASSEMBLY FOR ACOUSTIC SOURCES

[75] Inventor: Rune Tenghamn, Västerås, Sweden

[73] Assignee: PGS Seres AS, Lysaker, Norway

[21] Appl. No.: 08/913,550

[22] PCT Filed: May 14, 1996

[86] PCT No.: PCT/NO96/00119

§ 371 Date: Aug. 27, 1997

§ 102(e) Date: Aug. 27, 1997

[87] PCT Pub. No.: WO96/36888

PCT Pub. Date: Nov. 21, 1996

[30] Foreign Application Priority Data

May 18, 1995 [NO] Norway ..................................... 951949

[51] Int. Cl.[7] .............................. G01V 1/00; G01V 1/145; H04R 1/44
[52] U.S. Cl. ........................... 181/110; 181/120; 367/142
[58] Field of Search ...................... 73/594, 662; 181/110, 181/120; 367/142, 159, 163, 174, 168; 381/190

[56] References Cited

U.S. PATENT DOCUMENTS

| | | | |
|---|---|---|---|
| 3,701,968 | 10/1972 | Broding | 181/114 |
| 4,941,202 | 7/1990 | Upton | 367/165 |
| 5,329,499 | 7/1994 | Molund et al. | 367/174 |
| 5,646,380 | 7/1997 | Vaage | 181/110 |
| 5,786,537 | 7/1998 | Anstey | 73/662 |

*Primary Examiner*—Hezron Williams
*Assistant Examiner*—Rose M. Miller
*Attorney, Agent, or Firm*—Arnold & Associates

[57] ABSTRACT

The invention disclosed is a drive assembly for acoustic sources having sound emitting surfaces (1) adapted to be excited into vibrational motions. The invention is especially for use in seismic surveys. The drive assembly includes an electric rotational motor with at least one associated axle comprising at least an axle part (18) and a number of rods (21, 22) arranged radially in relation to the axle. The inner ends of the rods (21, 22) are influenced by the axle part (18) and the outer ends of the rods (21, 22) are adapted to excite the sound emitting surfaces (1) into vibrational motion. The inner ends of the rods (21, 22) are connected to the axle part (18) and the connection is adapted to perform both push and pull forces upon the rods. One or more spring elements (23) are provided between at least one of the rods (21, 22) and the sound emitting surfaces (1).

9 Claims, 4 Drawing Sheets

DRIVE ASSEMBLY FOR ACOUSTIC SOURCES

This invention relates to a drive assembly for acoustic sources having sound emitting surfaces adapted to be excited into vibrational motion, in particular for use in seismic prospecting.

TECHNICAL FIELD

Sources employed for generating sound waves in water can for example be sonar sources, flextensional sources or seismic transmitters or energy sources. Advantageously the invention can be employed for such types of sources, i.e. for emitting sound waves under water. Upon reflection from the sea bed and underlying geological formations, resulting echo signals can be detected by means of hydrophones or geophones of various types.

It is well known that low frequency sound waves can be transmitted over longer distances through water and geological structures than high frequency sound waves can. Within military applications as well as within the marine sector of oil and gas industry there has for a long time been a need for powerful low frequency sound sources which can operate under water. Sources of various constructions and designs for these purposes and fields of use, have been available for a long time. Such acoustic sources are for example described in Seismic Energy Sources 1968 Handbook, Bendix, United Geophysical Corporation 1968, and in Transducer Needs for Low-Frequency Sonar, Proceedings of the Second International Workshop on Power Transducers for Sonic and Ultrasonics, France, June 12–13, 1990.

Most of the acoustic sources employed today are of the impulsive type, in which efforts are made to have the sources emit as much energy as possible during as short time as possible. The frequency contents of such a source can be modified only to a very small degree, and different sources are selected for different surveying problems.

In recent time there have been developed seismic energy sources in the form of vibrators which can vibrate within various frequency bands, so-called "frequency sweep". To this group there belong vibrators which operate by employing hydraulic means and sources employing piezoelectric or magnetostrictive materials. In hydraulic vibrators a piston is controlled by a valve arrangement, and thereby it is possible to obtain large oscillation amplitudes. The piezoelectrical effect as known involves a change of length of a crystalline material when an electrical voltage is applied to the outer surfaces thereof, and conversely that an electrical voltage is generated when the material is subjected to a physical deformation. Magnetostriction means that a magnetic material being subjected to a magnetic field change will undergo a length change, and conversely that an applied length change of the material will give rise to a change of the magnetic field.

There are various manners of designing acoustic sources. For low frequency uses it is common to let the sources have a circular surface (in the form of a piston) when the hydraulic principle is employed, and a cylindrical shape with either a circular or elliptic cross-section when piezoelectric and magnetostrictive materials are used.

A concept where a hydraulic piston source is employed, is described in The Marine Vibrator Source, First Break Vol. 6 No. 9, September 1988/285.

The greatest problem with this type of controllable source is to obtain a well defined and sufficiently high amplitude of the oscillations. In order to obtain this there will be a need for either a large source surface or a small source surface having high oscillation amplitudes.

Vibrators based on the hydraulic principle (for example within marine seismic exploration) provide high amplitudes at low frequencies. The piston motions are controlled by a valve arrangement. The degree of control of these hydraulic piston sources as regards amplitude combined with frequency, is limited, however.

In Norwegian Patent 176.457 a drive assembly for acoustic sources is described based on a construction having a cylindrically shaped elastic shell or membrane with an elliptic cross section. The source has two beams at the ends of the main axis and the drive assembly is positioned between these end beams. The drive assembly comprises an electric motor connected to an axle, preferably with an oval and conic shape. The oval and conic shaped axle is in engagement with an adjustable cradle which is engagement against push rods which transfer the force to the membrane. The oval shape of the axle moves the cradle which again moves the push-rods, and thus the membrane. By varying the speed of the motor the frequency of the transmitted signal may be varied. The signal amplitude may be adjusted by shifting the cradle along the axis of the conically shaped axle. This way frequency sweeps may be obtained with a controlled amplitude. The shape of the axle may be changed to provide even more freedom of choice regarding frequencies and amplitudes.

A problem with previously known sources is the low efficiency when the source is working outside its resonance frequency. Depending on where the resonance frequency is located in relation to the applied frequency one may also experience phase shift and distortion of the signal. This complicates the control of the source, so that it is difficult to obtain a well defined signal. When the source is to be operated within a broad frequency spectrum the amplitude of the signal may vary with the frequency. This is a problem being solved by the present invention.

Based upon the abovementioned background the invention is aimed at acoustic sources of the type in which the sound emitting surfaces are adapted to being put in a vibrating motion, especially in seismic explorations at sea, and which comprises an electric rotation motor with at least one ancillary axle comprising at least one axle part and a number of rods being radially arranged in relation to the axle, the rods having inner ends being affected by the axle part and having outer ends being adapted to set the sound emitting surfaces in motion.

By varying the rotation speed the frequency of the vibrational motion may be varied to obtain frequency sweeps. To avoid the problems related to the resonance frequencies of the source the abovementioned rods may be mounted to the axle in such a way that they affect the sound emitting surfaces with a pulling motion as well as a pushing motion, so that the motions of the sound emitting surfaces are directly controlled by the axle. This provides a forced motion being less sensitive to resonance in the system.

In practice the push and pull motion may be obtained by providing an axle shaped as a crank axle alternately pushing and pulling the rods, which in turn moves the sound emitting surfaces providing the emitted oscillations.

The amplitude of the oscillations may be controlled by providing a spring between the rods and the sound emitting surfaces. In one specific case comprising a linear spring the well known relationship applies:

$F=kx$ in which F is the force, k is the spring constant and x is the displacement of the spring when forced from its equilibrium. At relatively low frequencies, compared to the chosen spring constant, the force affecting the spring will be relatively small. Thus, since the spring is linear and the spring constant unchanged, the compression of the spring is small, and the resulting motion of the sound emitting surfaces is correspondingly larger.

At relatively high frequencies the force which in a corresponding way affects, and thus compresses, the spring will be large. This leads to a corresponding damping of the motions of the sound emitting surfaces. In this way a smooth distribution of the amplitude in relation to the frequency is obtained, since the relationship between the output power P, force F the displacement d of the surfaces and the frequency $\omega$ ideally is as follows:

$P=Fd\omega$

As the sound emitting surfaces have an impedance a sweep will in practice give an increasing, flat or decreasing power distribution depending on the chosen spring and frequency range.

By active control of the spring constant the control of the power distribution may be improved even more by, among other things, providing a possibility for adapting to the resonance frequency of the rest of the structure of the source. Also the source achieves a broader working range by providing the possibility for avoiding resonance in the spring elements. By controlling the spring constant according to the rotation speed of the motor one may obtain any chosen distribution of emitted power as a function of frequency. To increase the freedom related to the amplitude even more, various solutions may be used to adjust the amplitude being transferred to the rods.

In other words the new and characteristic features of an acoustic source according to the invention is mainly that the inner ends of the rods are connected to the axle part and the connection is adapted to perform both pushing and pulling forces upon the rods, and that there is provided a spring element between at least one of the rods and the sound emitting surfaces.

In a preferred embodiment linear spring elements are used, possibly being provided with a variable spring constant, and the rotation motor may be provided with a variable speed to be capable of providing a frequency sweep.

The invention, as well as additional distinctive features related to this, will be further explained in the following, referring to the drawings.

Figure 1:
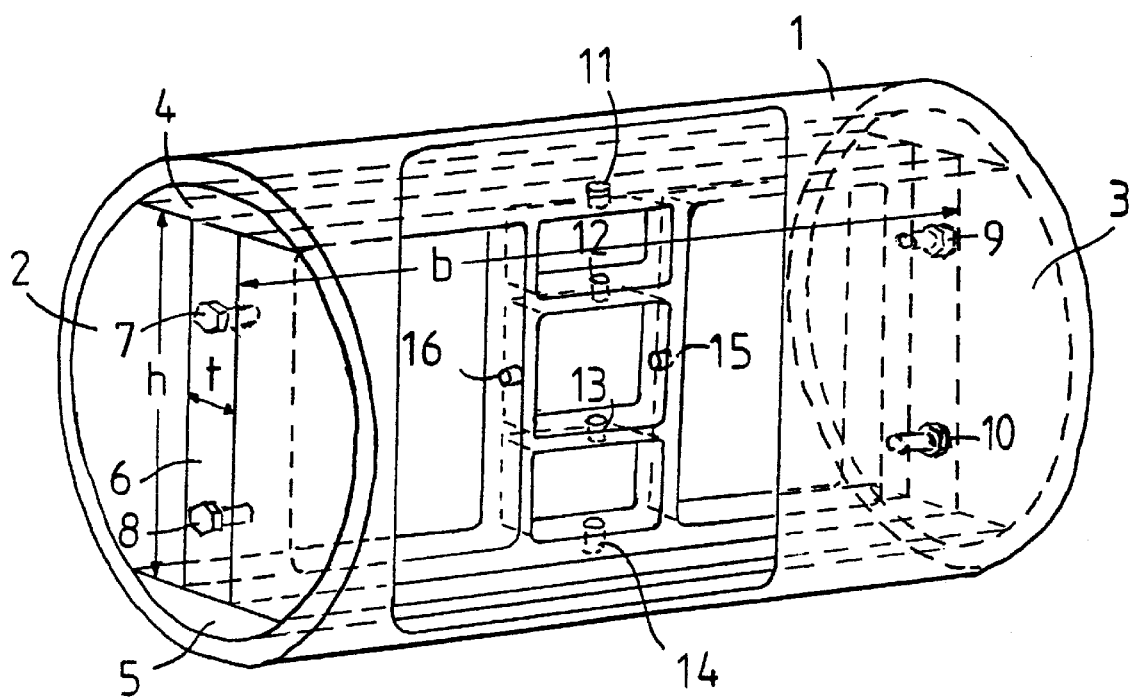
FIG. 1 shows a cylindrical acoustic source with an elliptic cross section comprising a drive assembly according to the invention.

An acoustic source in which the drive system according to the invention preferably can be employed, is shown in FIG. 1. As will be seen the source has a cylindrical shape with an elliptical cross-section. Externally the source consists of a casing surface in the form of an elastic membrane 1 and end plates 2 and 3. Inside the membrane there are two end beams 4 and 5 at the ends of the long axis of the elliptical cross-section. The membrane 1 acts as the sound emitting surfaces of the acoustic source.

The drive pack is mounted within a rectangular frame 6. The frame is located centrally inside the membrane in such a way that a plane midway between and parallel to both the height-width sides coincides with the plane of all long axes. The height h of the frame is so adapted that it generally corresponds to the free space between the end beams, which in practice means that the frame will engage the end beams. The width b of the frame corresponds to the axial length of the cylindrical membrane. Therefore the end plates of the the source can be attached with screws 7, 8, 9 and 10 to the height-width sides of the frame. The thickness t of the frame, i.e. the spacing between the two height-width sides, is broadly determined by the requirements to a practical building-in of the drive pack as well as the requirements as to dimensions of through-openings for the push rods. Since the frame is "floating" within the source when this—by means of the push rods—is arranged in a mechanically biased condition, the frame as such will not be subjected to any significant mechanical strain. Accordingly, the height and the width of the frame will mainly be determined by the number of push rods or drive packs being needed in order to obtain the desired acoustic power. Through-openings 11, 12, 13 and 14 for the push rods of the drive pack, are located in the frame along a common central axis or line. Through-openings 15, 16 for the motor axle and for the linear motor are provided in the frame normally to the openings for the push rods.

Figure 2A:
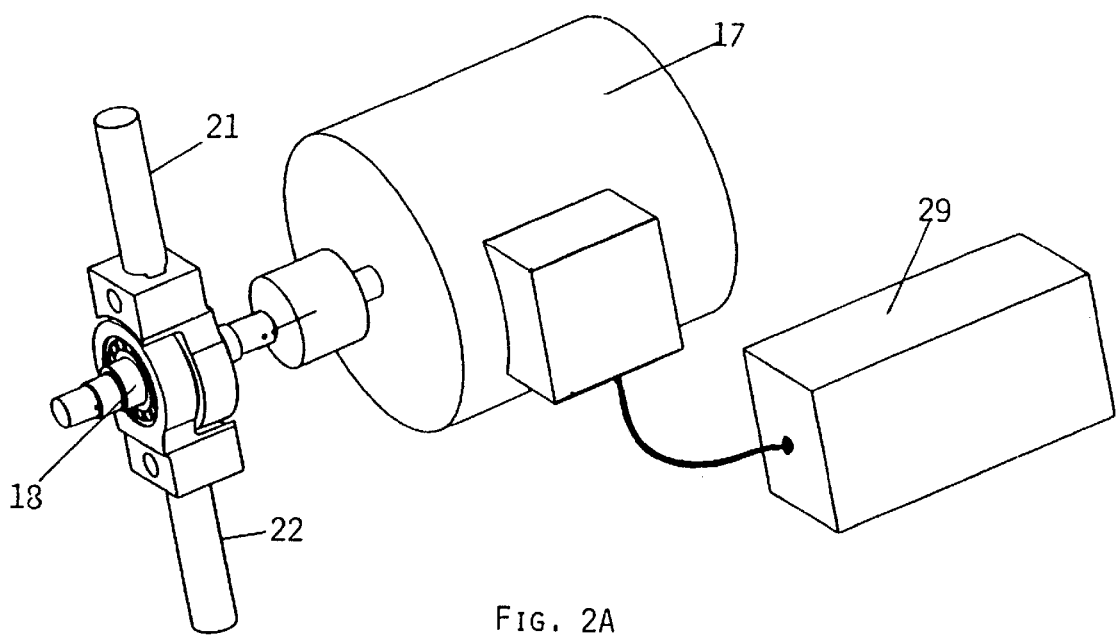
FIG. 2A shows the rotation motor with push and pull rods mounted on it.
Figure 2B:
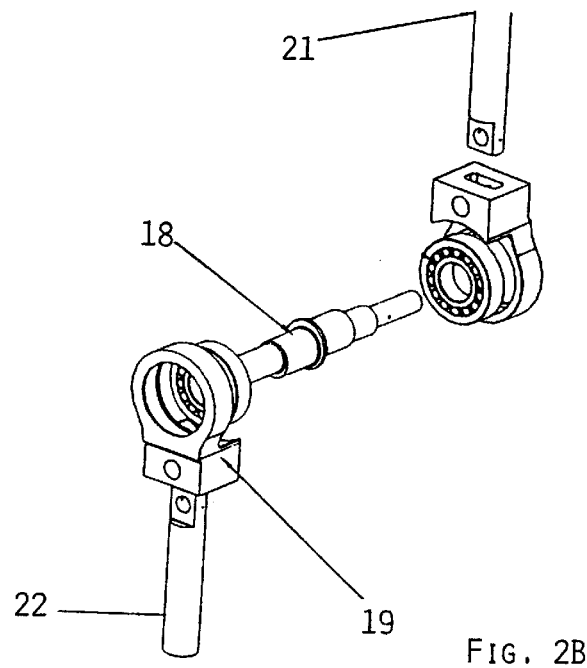
FIG. 2B shows in detail the connection between the rods and the axle.

In FIG. 2 an example is shown of how the electric motor 17 may be connected to an axle 18 being capable of causing two rods 21,22 to transmit a push and pull force to the sound emitting surfaces 1. In FIG. 2B the axle 18 is shaped as a crank axle being coupled to the rods 21,22 by ball bearings 19. When the axle rotates the rods 21,22 will thus get a forced reciprocal motion. The motion may be controlled with a control system adjusting the rotation speed of the motor, so that the frequency of the vibrational motion emitted from the sound emitting surfaces may be adjusted. In the figure the crank axle is shaped so that the rods 21,22 are moved simultaneously against each other and from each other along the same axis, so that the motion being transferred to the sound emitting surfaces 1 is as large as possible. Other patterns of motion, possibly comprising a larger number of push and pull rods, are also covered by this invention.

Even if the solution described here uses a crank axle other solutions also covered by the invention may also be employed, such as variants of cam shafts.

Figure 3:
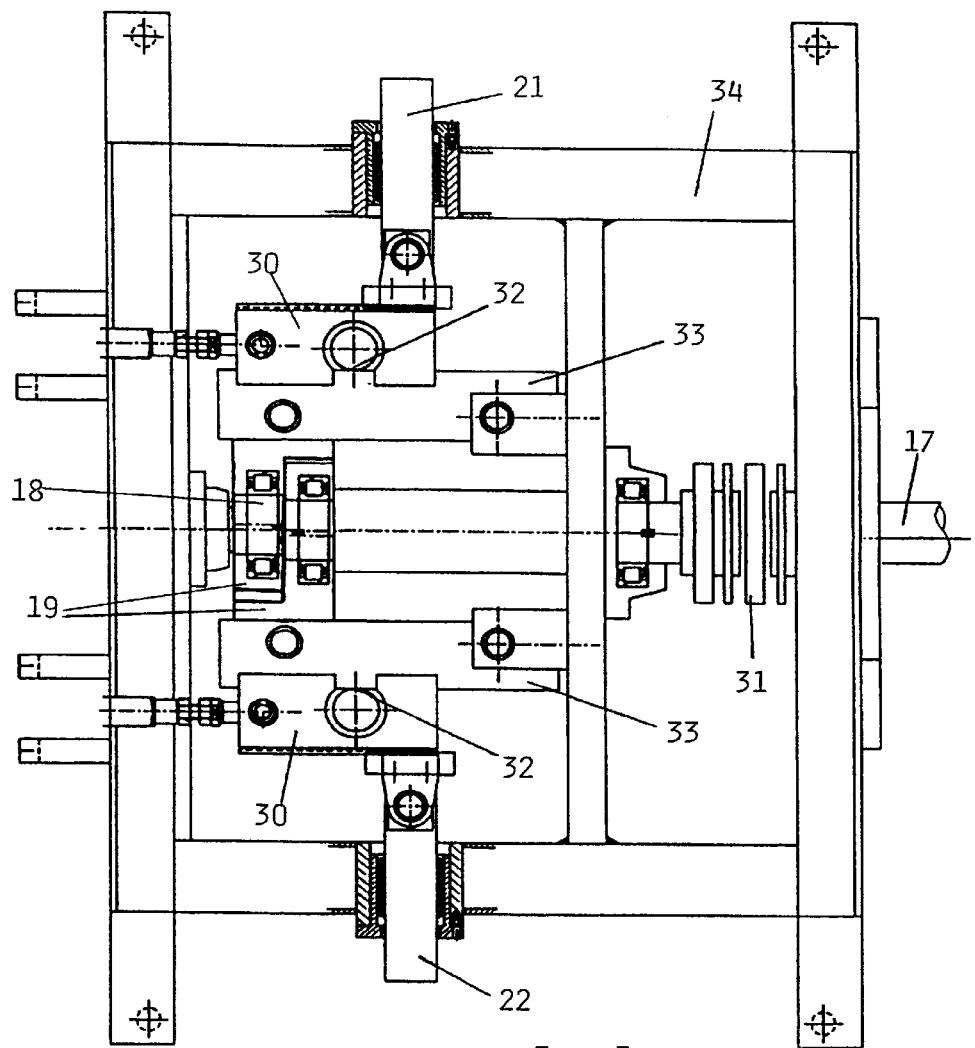
FIG. 3 shows a cross section of an embodiment providing increased control of the oscillation amplitude.

FIG. 3 shows a section of an embodiment of the invention also being provided with means for the controlling of the oscillation amplitude. Each of the rods 21,22 are mounted on the axle via a cradle 30 being capable of movement in the direction essentially perpendicular to the rods. The cradle 30 may, using a linear motor, be moved reciprocally along a beam 33, which is rotatably mounted in one end to a holder 34 being stationary in relation to the axle 18. The other end of the beam is rotatably coupled to the axle 18 through the ball bearings 19. The beam will therefore get a rotational motion in relation to the connection point between the beam and the holder 34. The motion of the axle is then transferred to the other end of the beam 33, and from there via the cradle 30 to the rod. As the connection point 32 between the cradle 30 and the beam 33 may be moved along the beam the amplitude of the transferred motion may be varied continuously. In this figure the motor 17 is connected to the crank axle through a gear 31.

Figure 4:
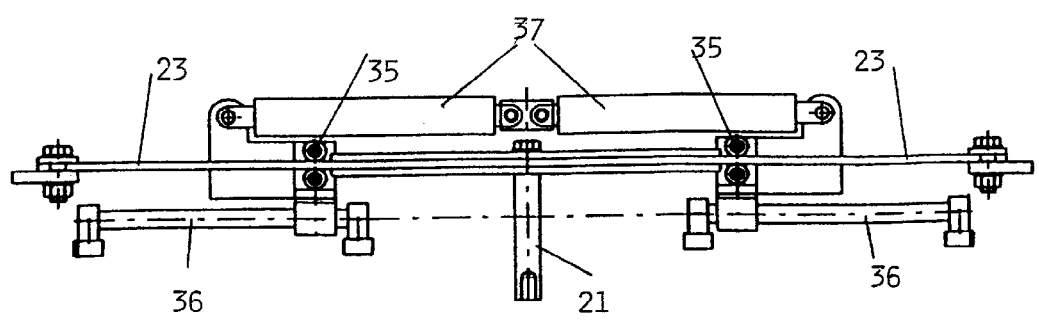
FIG. 4 shows an example of a spring with a controllable spring constant.

To be able to control the motions of the oscillating surfaces in relation to the resonances and amplitudes the spring elements may be provided with means to obtain an adjustable spring constant. FIG. 4 shows an example of an embodiment of such a spring device. The rod 21 is coupled to two plate springs 23 being fastened in their other ends in such a way that they transmit the motions to the sound emitting surfaces. Each spring 23 is provided with a glider 35 adapted to being shifted along the plate spring 23 and which is mounted on a slide bar 36 fastened to the holder. Two hydraulic cylinders 37 are adapted to move the contact point between the gliders 35 and the springs 23 so that the length of the oscillating part of the springs, and thus the spring constant, is adjusted.

Figure 5A:
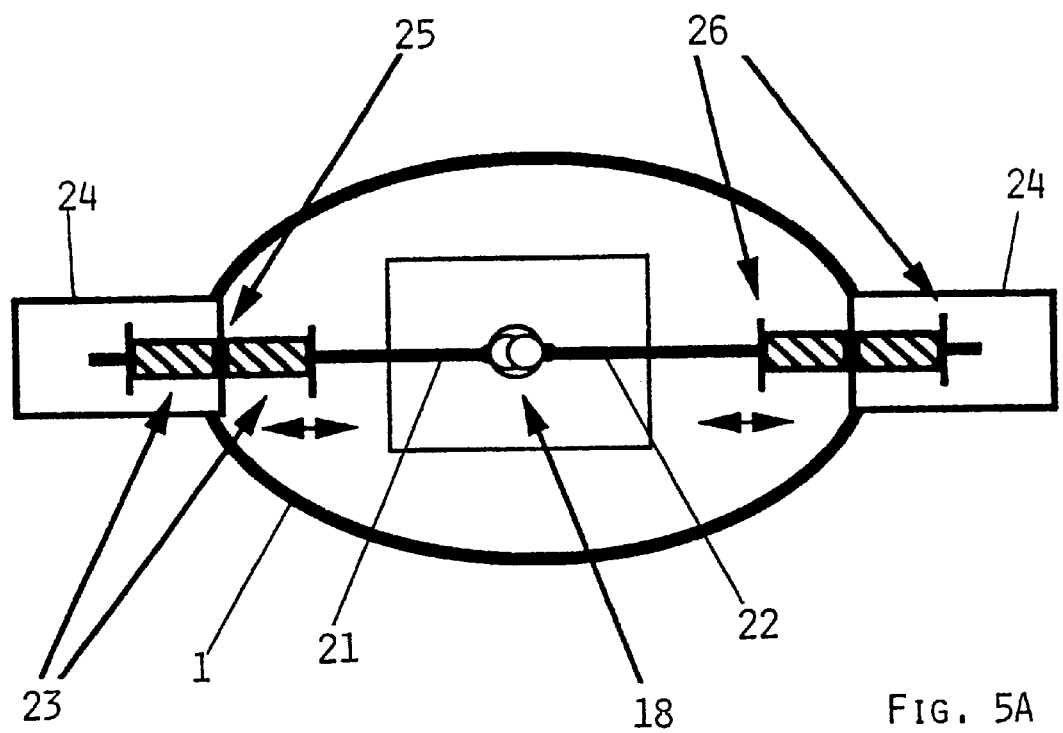
FIG. 5A shows an embodiment of the invention in which the sound emitting surfaces have an oval cross section.
Figure 5B:
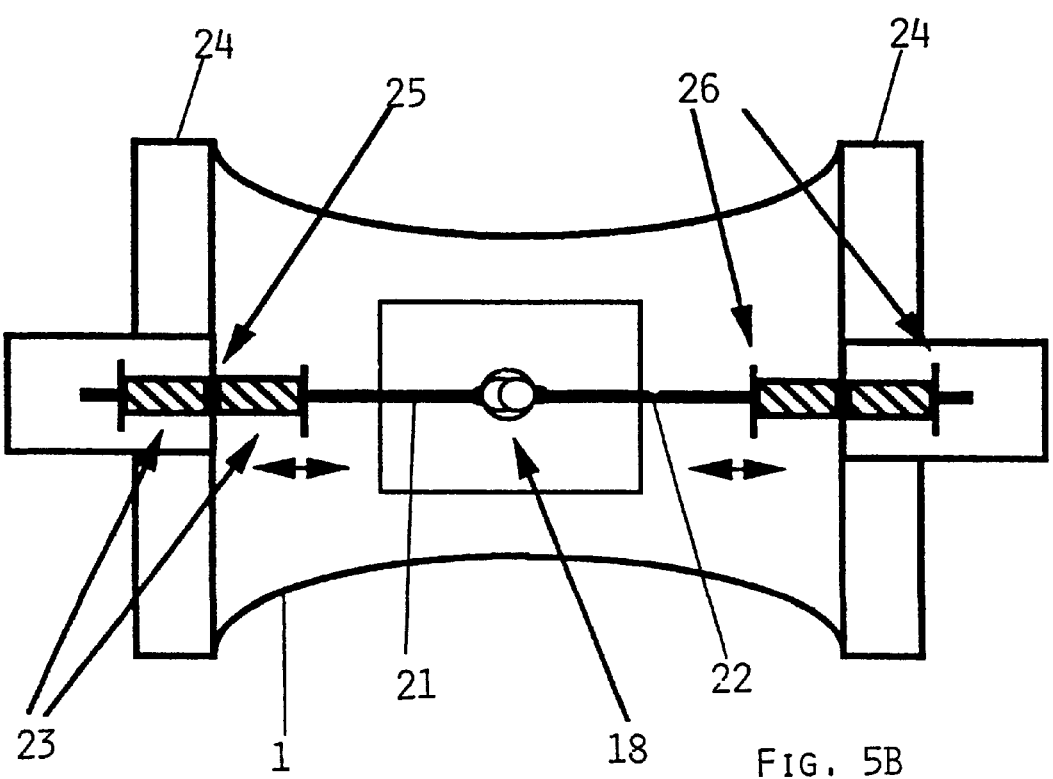
FIG. 5B shows in a similar way another shaping of the sound emitting surfaces.

FIG. 5 shows a section of two embodiments of the invention, in which the shapes of the sound emitting surfaces 1 are different. A more detailed description of these sources, especially the one illustrated in FIG. 5B, may be found in U.S. Pat. No. 5,757,728 to Tenghamn, et al (International patent application no. PCT/NO95/00071 and Norwegian patent application no. 94.1708), incorporated herein by reference.

The sound emitting surfaces 1 are mounted on a frame 6. The rods 21,22 are coupled to the frame 6 using spring elements 23. In this case the spring elements 23 comprise two springs mounted opposite sides of the fastening device 25 on the frame. The other ends of the springs are fastened to the rods 21,22 with suitable fastening devices 26, so that each movement of the rods is transmitted to the sound emitting surfaces through the spring elements 23 and the frame 6. The spring elements may, as described above, be chosen, depending on the preferred amplitude and frequency range, in many different ways.

What is claimed is:

1. Drive assembly for acoustic sources having sound emitting surfaces adapted to be excited into vibrational motions, especially for use in seismic surveys, comprising:

an electric rotational motor with at least one associated axle comprising at least an axle part and a number of rods arranged radially in relation to the axle, having inner ends being influenced by the axle part and outer ends being, adapted to excite said sound emitting surfaces into vibrational motion, characterized in that the axle part is shaped as a crank axle, the inner ends of the rods are connected to the axle part and the connection is adapted to exert both push and pull forces upon the rods, and there is provided one or more spring elements between at least one of the rods and the sound emitting surfaces.

2. Drive assembly according to claim 1, characterized in that said spring elements have a linear relationship between the applied force F and the length x of displacement, in its normal working range.

3. Drive assembly according to claim 1, characterized in that the spring elements have a variable spring constant.

4. Drive assembly according to claim 3, characterized in that said spring element is a plate spring with a variable oscillation length.

5. Drive assembly according to claim 1, characterized in that the rotation speed of the rotational motor is adjustable.

6. Drive assembly according to claim 1, characterized by being positioned inside the acoustic source, but with the rotational motor located outside the source.

7. Drive assembly according to claim 1, characterized in that there are provided two or more parallel axles, and that each axle has a number of rods.

8. Drive assembly according to claim 1, characterized in that means are arranged between the rods and said axle part for the variation of the amplitude of the transmitted motion.

9. Drive assembly according to claim 8, characterized in that said means comprise:

a beam with one end rotatably fastened to a holder being stationary in relation to the rotation axis of the axle, and with the other end being adapted to be set in motion by said axle part, and a movable cradle with a point of contact to said beam and being moveably fastened to one of the rods for transmitting of the radial movements of the point of contact to said rod.

* * * * *